United States Patent Office 3,345,305
Patented Oct. 3, 1967

3,345,305
METHOD OF PREPARATION OF SOLUTION CONTAINING BARIUM 137
André Bonnin, Antony, and Stéphane Yardamian, Paris, France, assignors to Saint Gobain Techniques Nouvelles, a French company
No Drawing. Filed Nov. 3, 1964, Ser. No. 408,668
Claims priority, application France, Nov. 8, 1963, 953,249; Oct. 15, 1964, 991,575
12 Claims. (Cl. 252—301.1)

The present invention has for its object a method of preparation of barium-137 from caesium-137.

The utilization of short-lived tracers is of great value for the purpose of limiting the period of contamination of an industrial product or for the purpose of carrying out successive experiments at close intervals on a same product. The applications of such tracers are numerous and varied in character, such as leak detection, study of the flow motion of fluids, measurement of flow rates, and so forth.

The chemical separation of a short-lived radioactive daughter element from its long-lived parent nucleus is an eminently suitable means of obtaining a radioelement which has a short half-life.

Among the various pairs which are possible, the pair caseium-137-barium-137 is of practical interest.

The uses to which barium-137 can be put have been found of great value in the field of medicine. One interesting feature is that it can be injected without danger in the human body and makes it possible by emission of gamma rays to measure the rate of circulation of the blood in living subjects.

Barium-137 is usually separated from caesium-137 by chromatographic process. Caesium is fixed on an ion exchange resin (of the Dowex type) which is contained in a column, barium-137 is then eluted by injection of a certain volume of eluting agent; said injection can be repeated approximately every ten minutes which is the time necessary for restoring the equilibrium $Cs^{137}$–$Ba^{137}$.

The ion exchange resins which have been employed up to the present time do not result, however, in a sufficiently selective separation of the two radioisotopes whereby barium-137 could be prepared a large number of times in a suitable form and with the requisite speed, starting from a same quantity of caesium-137.

The present invention has for its object a method of preparation of barium-137 starting from caesium-137 which supplies a remedy to the disadvantages noted above.

The method in accordance with this invention is essentially characterized by the successive stages of fixation of caesium-137 on a solid ferrocyanide of a transition element which is advantageously fixed on a solid support and more particularly on an ion exchange resin, said ferrocyanide being prepared from a colloidal ferrocyanide of a transition element in aqueous phase, said ferrocyanide being flucculated then extracted in an organic phase consisting of a volatile solvent, said solvent being finally evaporated, and of elution with an aqueous solution which is preferably charged with a salt.

The mode of preparation of ferrocyanides of collodial transition elements in aqueous and organic phases has been described in French Patent No. 1,375,007 filed on March 16, 1963, by the present applicant.

The ferrocyanides of colloidal transition elements in aqueous phase are obtained by mixing a solution of ferrocyanide of an alkali metal with a solution of the salt of a transition element. The aqueous colloids are flocculated by means of a quaternary ammonium salt. The flocculates are extracted in a volatile organic solvent. The evaporation of the solvent results in a solid ferrocyanide which is insoluble in water and the mechanical properties of which are very superior to those of the ferrocyanides which are obtained by direct precipitation.

The reagents which are employed in the preparation of the colloid in aqueous phase are preferably highly dilute in such a manner as to obtain a stable colloid. A $2\times10^{-3}$ M solution of an alkali ferrocyanide is mixed, for example, with an equal volume of a $3\times10^{-3}$ M solution of a copper salt. It will be understood that these concentrations are only given by way of illustrative example since they can vary over a wide range. A very good flocculation of the aqueous colloid is obtained by adding, for example, 4 parts of a $5\times10^{-3}$ M solution of a quaternary ammonium salt such as lauryl-benzyl-dimethyl-ammonium chloride to 50 parts of the colloidal $10^{-3}$ M solution of copper ferrocyanide. The flocculate is then extracted from the aqueous phase by a volatile organic solvent such as trichloroethylene or methyl-isobutyl-ketone. The concentration of the colloid in organic phase will preferably be of a high order in order to reduce the volume of solvent which is necessary and consequently the evaporation time.

The evaporation of the solvent supplies a solid copper ferrocyanide having mechanical properties which are distinctly improved in comparison with the copper ferrocyanide which is obtained by precipitation. The ferrocyanide obtained has good stability under radiation and a high caesium-fixation power. This fixation power is of the order of 5 curies of caesium per gram of solid ferrocyanide, and is therefore considerably in excess of practical requirements since these vary between 5 and 10 millicuries of barium-137 at the output of the generator.

The solid ferrocyanide which fixes caesium must satisfy very stringent conditions of utilization. It must in particular have very good mechanical strength: those solid particles which have the finest size must not be carried away by the eluting agent. It must not be subjected during operations to any physico-chemical modification which is liable to liberate the caesium.

In order that the mechanical strength and caesium-fixation power of the ferrocyanides may be further increased, said ferrocyanides are fixed in accordance with a particularly important provision of this invention on a number of different supports such as collodion and more especially on ion exchange resins. It is made possible by these means to avoid the difficulties of filtration which arise from the formation of very fine particles and the yield is improved by increasing the solid-liquid contact surface.

The ferrocyanide can, for example, be incorporated with a collodion film. In order to form this film, the procedure is as follows. As has been described in the patent application referred-to above, the starting material employed is a collodial ferrocyanide which is obtained by mixing equal volumes of a solution of ferrocyanide of an alkali metal and a solution of a salt of a transition element; said colloid is passed through an organic phase such as trichloroethylene which is chosen by reason of its high volatility, then mixed with a solution of collodion in ethyl acetate. After spreading and drying, a tough film is obtained which is usually cut into strips and which readily fixes caesium.

The ion exchange resins which are employed for the fixation of ferrocyanide are, for example, of the Dowex type or preferably of the Amberlyst type. The direct fixation of the ferrocyanides by the ion exchange resins can be explained as follows. The colloidal particles of ferrocyanide are negatively charged and therefore behave as anions. It can be considered that these particles are exchangeable with the ions of an anion resin.

In a first mode of operation, the anion resin is contacted and stirred with a colloidal ferrocyanide such as copper ferrocyanide. Said resin is then treated with a caesium solution and placed in a column. In accordance with a second mode of operation, ferrocyanide anions are first fixed on the resin and a copper salt such as copper nitrate, copper sulphate or copper chloride is then caused to react with this resin. The reaction is particularly rapid with a concentrated solution of copper chloride. The addition of the concentrated copper chloride solution can advantageously be carried out in the presence of a dilute solution of potassium chloride, the caesium-fixing power of the resin being thus substantially increased.

The resin which is thus treated effectively fixes caesium-137, and barium-137 can be eluted therefrom with a practically quantitative yield.

Said resin also has a very good ability to fix caesium which is contained in an aqueous solution when the solution is passed rapidly through a column which is filled with this resin. This property permits of substantial improvement of the barium generator when this latter is fitted with a retaining capsule or trap capsule filled with an inactive resin for the purpose of retaining the caesium which might otherwise pass out with the eluate. The said retaining capsule permits the possibility of reducing the contamination of the eluate by a factor which is higher than 100. This feature is of particularly great value when the solution of barium-137 is intended to be employed for medical purposes, in which case the eluate required must have as low a level of contamination as possible.

The design of a barium generator for medical use must take account of the following conditions:

High activity within a small volume
As low a level of contamination as possible
An eluate which is sterile, isotonic and free from harmful substances.

The short half-life of barium makes it necessary to inject this latter within a period of five minutes from the time of its separation. A rapid method of sterilization is therefore called for. To this end, the eluate to which a salt solution has previously been added is accordingly passed through a sterilizing filter. The addition of a salt solution permits the quantitative passage of the barium through the filter.

The solution to be injected must have a molecular concentration such that there is equality of osmotic pressure with the blood. This condition is not essential, however, inasmuch as the volumes which are injected are usually small. Finally, it is necessary to ensure that the eluting agent does not react with the copper ferrocyanide.

Eluting agents which give very good results are, for example, sodium chloride having a concentration of 9 g./l., calcium gluconate of 10% concentration, calcium levulinate. In the case of a barium-137 generator for medical purposes, special preference will be given to calcium levulinate, which results in practically negligible contamination.

There will now be given below a number of examples of application both of the method of preparation of barium-137 and of a barium-137 generator in accordance with the invention. Consideration will be given in these examples to the principal factors which have an influence on the efficiency of the generator such as the choice and preparation of the resin and the choice of eluting agent.

The practical arrangements which will be described in connection with these examples must be considered as forming part of the invention, it being understood that any equivalent arrangements could equally well be employed without thereby departing from the scope of the invention.

Examples 1, 2 and 3 relate to the preparation of barium-137 by direct fixation of caesium on the ferrocyanide of a transition element such as mixed ferrocyanide of copper and potassium.

Examples 4 and 5 show the fixation of caesium on a ferrocyanide which is incorporated in a collodion film.

Examples 6 and 7 illustrate the preparation of barium-137 when the ferrocyanide is fixed on a resin of the Dowex type.

Examples 8, 9 and 10 serve to show the advantages conferred by the use of a trap in a barium-137 generator, the active portion of which is constituted by a column filled with ferrocyanide fixed on a resin of the Dowex type.

Example 11 illustrates the preparation of barium-137 when the ferrocyanide is fixed on a resin of the Amberlyst type.

Example 12 shows that the caesium-fixing power of the resin can be substantially increased when this latter, which has previously been put in the form of ferrocyanide, is treated with a concentrated solution of copper chloride and a dilute solution of potassium chloride.

Example 13 illustrates the preparation of barium-137 when the ferrocyanide which is chosen is a mixed ferrocyanide of nickel and potassium and when it is fixed on a resin of the Amberlyst type.

Example 14 relates to two tests which are intended to compare the respective caesium-fixing power of Dowex resin and Amberlyst resin.

Example 15 is concerned with the utilization of calcium levulinate as eluting agent in a barium generator for medical purposes.

Example 16 gives the characteristics of a barium-137 generator in accordance with the invention which is especially intended for medical applications.

It will be recalled that the efficiency of a generator is characterized by the ratio $$E=\frac{A_o}{A_f}$$

wherein $A_f$ designates the activity which is fixed on a cow and $A_o$ designates the total initial activity of the milk obtained in one milking.

The contamination is characterized by the ratio:

$$C=\frac{A_r}{A_o}$$

wherein $A_r$ is the residual activity of the eluate as measured after a period of time which is sufficient to ensure that all of the barium has disintegrated. This residual activity is due to a contamination of the eluate by the caesium.

The parameters E and C serve to determine the properties of a generator.

*Example 1*

Mixed ferrocyanide of copper and colloidal potassium in aqueous phase was prepared in the following manner: there were mixed equal volumes of a potassium ferrocyanide solution: $2 \times 10^{-3}$ M/l. $K_4Fe(CN)_6$ and a copper nitrate solution: $3 \times 10^{-3}$ M/l. $Cu(NO_3)_2$.

The starting material employed was one liter of this colloidal ferrocyanide having a molar concentration of $10^{-3}$ which was placed in a separating funnel. There were added 80 ml. of $5 \times 10^{-3}$ M solution of lauryl-benzyl-dimethyl-ammonium cequartyl or chloride. Stirring was then performed in order to homogenize the aggregate.

Flocculation appeared after a few seconds. There were then added 10 ml. of trichloroethylene and the aggregate was stirred. The organic phase assumed the brown color of copper ferrocyanide whereas the aqueous phase was discolored.

After decantation and removal of the aqueous phase, 10 ml. of copper ferrocyanide having a molar concentration of $10^{-1}$ were then collected in the trichloroethylene (the concentration is relatively high in order to prevent evaporation of too large volumes of solvent). A light current of air was employed and this made it possible to accelerate the removal of trichloroethylene. After completion of the evaporation process, there was collected a solid and brittle product having a dark brown color which was insoluble in water but which could be dispersed in the usual organic solvents.

A quantity of 0.372 g. of this solid product was weighed and pulaced in an Erlenmeyer flask containing 50 ml. of a caesium-137 solution, the activity of which as measured in pulses per minute under predetermined counting conditions was 1,408 pulses per ml.

The solution was stirred magnetically for a period of 30 minutes. The activity of a test sample of 1 ml. after a rest period of 20 minutes was zero. Caesium fixation on the solid was 100%.

The total activity which was collected on this latter was therefore:

$$A_f = 1,408 \times 50 = 70,400 \text{ pulses per minute}$$

The active product which was prepared as hereinabove stated was stirred for a period of 5 minutes with 10 ml. of a solution of barium nitrate having a concentration of 30 g./l.

After decantation, 4 ml. of solution were drawn off for counting purposes. The first activity measurement took place five minutes after completion of the stirring operation. The activity was then measured at one-minute intervals in order to follow the rate of decay.

The logarithm of activity was a linear function of time. This property permitted the extrapolation at the initial moment (stopping of the stirring operation, for example).

The results obtained are recorded hereunder:

| Time (in minutes after completion of agitation) | Measured activity of a test sample of 4 ml. (in number of pulses per minute) | log A |
|---|---|---|
| 5 | 4,083 | 3.61 |
| 6 | 3,221 | 3.51 |
| 7 | 2,441 | 3.39 |
| 8 | 1,066 | 3.26 |
| 9 | 1,397 | 3.14 |
| 10 | 1,111 | 3.04 |
| 11 | 870 | 2.94 |
| 12 | 703 | 2.84 |
| 13 | 544 | 2.73 |
| 14 | 400 | 2.60 |
| 15 | 300 | 2.47 |
| 30 | 52 | -------- |

The movement proper of the tube gave an activity of 31. Hence:

$$A_r = 52 - 31 = 21 \text{ pulses per minute}$$

By constructing the straight line log A as a function of time and by extrapolating, there is found log $A_0$; then $A_0 = 16,600$ pulses/min.

Since the volume employed was 10 ml.; the total activity in Ba-137 is:

$$A_0^{tot} = 16,600 \times 2.5 = 41,500 \text{ pulses/min.}$$

We deduce therefrom:

The efficiency:

$$E = \frac{41,500 \times 100}{70,400} = 59\%$$

The contamination:

$$C = \frac{21}{41,500} = 5 \cdot 10^{-4}$$

Example 2

Four grams of solid copper ferrocyanide prepared as indicated in Example 1 were charged with caesium. The activity which was fixed and measured under predetermined conditions was 100,000 pulses/min. The solid ferrocyanide was placed in a small glass column welded to the extremity of a syringe which made it possible to elute in a few seconds per 10 cm.³ of an aqueous solution of barium nitrate.

The activity which was eluted at each operation, as considered at the exact moment of completion of the elution process, varied between 12,500 and 20,000 pulses per minute, namely between 12.5 and 20% of the activity which was fixed on the ferrocyanide. The quantity of caesium which was extracted at the same time was less than 1/2,000 of the activity which was fixed on the ferrocyanide. After approximately fifty operations, the behavior of the generator proved to be identical with its initial behavior.

Example 3

A "Pyrex" capsule was employed, which was filled with a glass powder, or "frit No. 4." There was fixed on the copper ferrocyanide prepared as described in Example 1 an activity of 1 mc. on 0.3 g. of dry product.

The caesium extraction yield was 99.975%.

The activity fixed was:

$$A_f = 1.47 \cdot 10^8 \text{ pulses/min.}$$

The volume of each elution was 10 ml.

In order to follow the decay rate of barium over a larger number of periods, 1 ml. of eluate S0 was taken and diluted in 100 ml. (S100), then 1 ml. of S0 was diluted in 10 ml. (S10).

The three solutions S100, S10, S0 have specific activities $Ac/100$, $Ac/10$, $Ac$ being the specific activity of the eluate.

Results obtained:

(1) With $Ca(NO_3)_2$: 5 g./l.

Volume of eluate collected _____ 10 ml.
Total activity obtained _____ $2.3 \cdot 10^7$ pulses/min.
Efficiency _____ 15.6%.
Residual activity _____ 2925 pulses/min.
Contamination _____ $1.3 \cdot 10^{-4}$ pulses/min.

(2) With $NaNO_3$: 5 g./l.

Volume of eluate collected _____ 10 ml.
Total activity obtained _____ $1.595 \cdot 10^7$ pulses/min.
Efficiency _____ 10.8%.
Residual activity _____ 18,000 pulses/min.
Contamination _____ $10^{-3}$.

Example 4

5 ml. of $10^{-1}$ M/l. $Cu_3K_2[Fe(CN)_6]_2$ in trichloroethylene were added to 10 ml. of collodion containing 2.5% dry extract in ethyl acetate. The spread factor was 80/100. The surface area of the film obtained was 56 cm.².

The film which was cut into strips had extracted 95% of caesium-137 contained in 100 ml. of a solution having a specific activity of 3,200 pulses/min.

The total fixed activity $A_f$ was therefore: 300,000 pulses/min.

The strips of films were placed in a column packed at the bottom with a "frit No. 1."

The eluting operations performed with this generator using different solutions gave the following results:

| Solution | Volume, ml. | Efficiency, percent | Contamination |
|---|---|---|---|
| $Ba(NO_3)_2$, 20 g./l. | 5 | 10 | $10^{-4}$ |
| $Ca(NO_3)_2$, 5 g./l. | 16 | 12 | $4 \cdot 10^{-4}$ |
| $Ba(NO_3)_2$, 20 g./l. | 16 | 27 | $10^{-4}$ |
| $Ba(NO_3)_2$, 10 g./l. | 16 | 22 | $10^{-4}$ |
| $BaCl_2$, 240 g./l. | 16 | 33.5 | $10^{-4}$ |
| NaCl, 9 g./l. | 16 | 11 | $3 \cdot 10^{-3}$ |
| $Ca(NO_3)_2$, 200 g./l. | 16 | 50 | $6 \cdot 10^{-4}$ |

Example 5

The starting material employed was 1 cm.² of film containing the equivalent of 4 ml. of $10^{-3}$ M/l.

$$Cu_3K_2[Fe(CN)_6]_2$$

mixed with a collodion containing 2.5% dry extract in ethyl acetate.

After agitation of said strip of film over a period of 24 hours in the presence of 100 ml. of a solution of caesium-137 having an activity of 3,250 pulses/min. per ml., an extraction yield of 98.5% was noted, namely a fixed activity of:

$$A_f = 320,000 \text{ pulses/min.}$$

The eluting operations produced the following results:

| Solution | Volume, ml. | Efficiency, percent | Contamination |
|---|---|---|---|
| NaCl, 9 g./l | 4 | 10 | $1.7 \cdot 10^{-2}$ |
| NaCl, 9 g./l | 10 | 10 | $2.2 \cdot 10^{-2}$ |
| NaCl, 9 g./l | 16 | 29 | $1.5 \cdot 10^{-2}$ |

It appears from a comparison of Examples 4 and 5 that:

The sodium chloride results in higher levels of contamination than the other salts, The salts of barium and of calcium produce satisfactory results if one remains within a zone of concentration of the order of 5 to 20 g./l.

*Example 6*

There was weighed a quantity of 2 grams of Dowex 1 x 8 anion resin having a particle size of 100–200 mesh.

The said 2 grams of resin were contacted and stirred for a period of 2 hours with 100 ml. of a $10^{-3}$ M/l. solution of colloidal copper ferrocyanide.

The resin assumed a brown color but the greater part of the ferrocyanide remained in solution.

This resin, which was treated with a caesium-137 solution, had acquired an activity:

$$A_f = 235,000 \text{ pulses/min.}$$

and was placed in a column.

An elution with 16 ml. of 9 g./l. of NaCl produced:

$$E = 77\% \quad C = 2 \cdot 10^{-3}$$

The yield is therefore distinctly improved by the use of the resin as support. This fact is due to a higher efficiency of the solid-liquid contact, the ferrocyanide remaining fixed in a thin layer at the surface of the resin particles.

*Example 7*

There was weighed a quantity of 20 grams of Dowex 1 x 8 resin having a particle size of 100–200 mesh. Washing with water was carried out and the finest particles were eliminated by decantation and successive withdrawals.

The resin was then contacted with 100 ml. of a solution of $2 \times 10^{-2}$ M/l. of $K_4Fe(CN)_6$.

A yellow coloration appeared within the resin which immediately fixed all of the ferrocyanide. The supernatant liquor produced no coloration with a copper solution and therefore no longer contained any ferrocyanide ions.

The resin was washed once again.

There were then added 100 ml. of a solution of $3 \times 10^{-2}$ M/l. of $CuSO_4$.

During a period of agitation lasting 30 minutes, the resin progressively assumed a dark green hue.

2 grams of this resin were contacted for a period of 2 hours in an Erlenmeyer flask with 24 ml. of a caesium-137 solution having a specific activity of 15,750 pulses/min. An extraction yield of 99.3% was noted.

The fixed activity was:

$$A_f = 375,600 \text{ pulses/min.}$$

The resin charged with caesium-137 was then placed in a graduated burrette above a small wad of glass wool.

The elutions performed under identical conditions gave the following results:

| Solution | Volume, ml. | $A_o$ | $A_r$ | E, percent | C |
|---|---|---|---|---|---|
| NaCl, 9 g./l | 4 | 235,000 | 760 | 62 | $3 \times 10^{-3}$ |
| NaCl, 9 g./l | 4 | 190,000 | 650 | 50 | $3 \times 10^{-3}$ |
| $H_2O$ | 4 | 145,000 | 13 | 40 | $8 \times 10^{-5}$ |
| $H_2O$ | 4 | 200,000 | 0 | 57 | $10^{-5}$ |

It will be noted from the above that the yields are fairly high, even with pure water, which had not been observed in the case of the products obtained heretofore.

The contamination which still remains high with NaCl becomes negligible in the case of water.

*Example 8*

A quantity of 10 grams fo Dowex 1 x 8 resin having a particle size of 100–200 mesh is saturated with ferrocyanide anions by means of 600 ml. of a 0.02 M solution of $K_4Fe(CN)_6$. The resin thus treated was contacted for a period of 4 hours with 600 ml. of a 0.03 M solution of $CuSO_4$.

There was fixed on 2.5 grams of this product 1 millicurie of caesium-137. The $\gamma$ activity, as measured under predetermined conditions, was equal to $1.2 \times 10^8$ pulses per minute. The said 2.5 grams were placed in a column having a cross-sectional area of 1 cm.² The barium-137 was eluted with 4 ml. of water. The activity of the eluted barium, as related to the moment of completion of the elution process, was $9.55 \times 10^{-7}$ pulses per minute, namely a yield of 79%. The activity of caesium-137 contaminating the barium was 9,000 pulses per minute. The ratio of caesium activity to barium activity on completion of the elution process was therefore equal to $9.4 \times 10^{-5}$.

There was then incorporated with the above-mentioned generator a retaining capsule consisting of 2.5 grams of inactive product within a column having a cross-sectional area of 1 cm.² The elution with 10 ml. of water resulted in a barium activity of $1.0 \times 10^8$ pulses per minute as related to the end of the elution process, namely a yield of 83%. The contamination of the barium by the caesium was only 67 pulses per minute. The ratio of caesium activity to barium activity at the end of the elution process was therefore only $6.7 \times 10^{-7}$.

*Example 9*

In order to check whether the resin which is treated with copper ferrocyanide could constitute a trap and retain the caesium which contaminates the milk produced by a cow, the following test was performed.

In a separating funnel of 150 ml. capacity, there was placed approximately 2 grams of resin between two beds of glass wool.

On the other hand, a caesium-137 solution was prepared having a specific activity of 1,550 pulses per minute.

20 ml. of this solution passed through the resin bed at a rate of flow of 2 ml./min. After counting, it was found that the residual activity of the solution which was collected was 6 pulses/min. Hence a decontamination factor:

$$fd = \frac{1550}{6} = 258$$

This result makes it possible to contemplate a reduction of the contamination of each cow by a factor of 100, by providing it with a retaining capsule or trap which conatins the inactive product.

*Example 10*

Use was made of a device which consisted of a first column having an internal diameter of 15 mm., a height of 40 cms., and comprising a pastille of "frit No. 1" and a conical ground joint at one end. The device also comprised a second column having the same diameter and a height of 6 cms. which was designed to be fitted at the bottom of the column mentioned above by virtue of the conical ground joint. This second column terminated in a "frit No. 1" and a stopcock.

A quantity of 2.5 grams of moist resin prepared as indicated in Example 6 fixed 1 mc. of caesium-137, which corresponded to a total activity of:

$$A_f = 1.2 \times 10^8 \text{ pulses/min.}$$

This resin was placed in the first column.

A quantity of 2.5 grams of resin was placed in the second column which performed the function of trap.

The elutions performed with pure water, without trap and with trap, gave the following results:

(1) Without trap:

| Eluting agent | $A_o$ | $A_r$ | E, Percent | C |
|---|---|---|---|---|
| 4 ml. H₂O | $1.2 \times 10^8$ | 12,700 | 100 | $10^{-4}$ |
| 4 ml. H₂O | $1 \times 10^8$ | 24,000 | 83 | $2 \times 10^{-4}$ |
| 4 ml. H₂O | $9.55 \times 10^7$ | 9,000 | 68 | $9 \times 10^{-5}$ |

(2) With trap:

| Eluting agent | $A_o$ | $A_r$ | E, Percent | C |
|---|---|---|---|---|
| 7 ml. H₂O | $7.44 \times 10^7$ | 21 | 60 | $3 \times 10^{-7}$ |
| 10 ml. H₂O | $5.45 \times 10^7$ | 92 | 45 | $1.7 \times 10^{-6}$ |
| 10 ml. H₂O | $10^8$ | 67 | 83 | $6.7 \times 10^{-7}$ |

The level of contamination when using pure water and without any trap which is of the order of $10^{-4}$ falls, by means of the trap, to wholly negligible values. The yields remain at appreciably high values, provided that a sufficient elution volume is ensured in order to carry down all of the barium from the active zone.

*Example 11*

An anion exchange resin Amberlyst A27 was ground and screened. The particles having a diameter within the range of 0.1 to 0.2 mm. were retained.

This fraction was saturated with a potassium ferrocyanide solution having a concentration of $2 \times 10^{-2}$ M/l., then treated with a concentrated solution of copper chloride.

After rinsing and drying, the product was capable of fixing 0.06 millequivalent of caesium per gram. This quantity is equivalent to 280 millicuries of caesium-137.

720 mg. of the product thus prepared were placed in a column 0.4 cms. in internal diameter and 10 cms. in height. There was fixed therein 1 millicurie of caesium-137, which corresponds under well-defined conditions of measurement, to $115 \times 10^6$ pulses per minute.

The elution with 2 ml. of water yields an activity of $48 \times 10^{-6}$ pulses per minute under the same conditions of measurement.

After decay of the barium-137, there is no longer any detectable activity of caesium-137 in the eluate. The ratio of eluted caesium-137 activity to barium activity is therefore lower than $10^{-7}$.

*Example 12*

The same fraction of the same resin as in Example 10 which was similarly put in the form of ferrocyanide was treated with a solution of copper chloride (concentration close to saturation) and of potassium chloride (1 M/l.).

After rinsing and drying, the product was capable of fixing 0.15 milliequivalent of caesium per gram. This quantity is equivalent to 700 millicuries of caesium-137.

*Example 13*

Amberlyst A27 resin, the particle size of which was within the range of 0.1 to 0.2 mm. was saturated with ferrocyanide anions as indicated in Example 10, then contacted over an extended period of time with a saturated solution of nickel chloride.

There was formed with the resin thus treated a bed 20 mm. in diameter and 15 mm. in depth. There was fixed on the bed a caesium-137 activity which corresponds to 350,000 pulses per minute under conditions of measurement which are determined in advance.

Elution with 4 cu. cms. of an aqueous solution of calcium levulinate yields a barium-137 activity of 260,000 pulses per minute, namely 74% of the fixed activity. The contamination by caesium-137 is 18 pulses per minute.

The caesium to barium ratio in the eluate is therefore equal to $7 \times 10^{-5}$.

*Example 14*

A barium-137 generator was designed and developed with the following characteristics:

There was placed in a column having an internal diameter of 4 mm. and a height of 10 cms. a volume of resin of 1.2 cm.³ and having a particle size within the range of 0.10 to 0.20 mm.

In order to reduce the dead volume to the maximum extent, the bottom of the column was fastened to the end-piece of a syringe by means of a nylon fabric washer.

Steps were taken to obtain an activity of the order of 30 millicuries in 2 cubic centimeters of eluate, the expected result being a fixed activity of 40 millicuries in a quantity of resin of the order of one gram.

There were employed in a first test 2 grams of Dowex 1 x 8 resin prepared as specified in Example 6. This resin was stirred for a period of one hour in the presence of 50 ml. of caesium $1.6.10^{-4}$ and the tracer.

In a second test, 2 grams of Amberlyst A27 resin were employed.

The quantity of caesium fixed was equivalent to an activity of 40 mc.

The activity of the solution prior to contacting with the resin was noted as follows:

$$A = 5,476 \text{ pulses/min. per ml.}$$

After stirring and decantation, the residual activity $A_r$ was measured and the percentage of fixation was deduced therefrom:

| | Dowex 1 x 8 treated with CuSO₄ | Dowex 1 x 8 treated with concentrated CuCl₂ | Amberlyst A27 treated with concentrated CuCl₂ |
|---|---|---|---|
| $A_r$ (pulses/min.) | 4,500 | 3,100 | 45 |
| E (percent) | 17.8 | 43 | 99 |

It is apparent from the above that Amberlyst which is treated with copper chloride provides better results than Dowex resin from the point of view of caesium fixation.

*Example 15*

A quantity of 1 gram of resin prepared as indicated in Example 6 was placed within a tube having a diameter of 5 millimeters. The depth of the resin was 15 centimeters.

Activity fixed on the resin:

$$A_f = 455,000 \text{ pulses/min.}$$

The elution was carried out with 2.5 ml. of calcium levulinate.

$A_o = 400,000$ pulses/min., namely an efficiency of $E = 89\%$.

$A_r = 0$, namely, zero contamination.

*Example 16*

A barium-137 generator was designed and developed especially for medical purposes. This generator had the following characteristics:

In order to have available a few millicuries of barium-137 at the moment of the injection, it is advisable to provide a fixed activity of the order of 40 to 50 mc. in caesium-137.

Since a sufficient quantity of caesium-137 was not available, only 1 mc. was fixed. However, the equivalent of 50 mc. in inactive caesium was also fixed so as to simulate the final generator as closely as possible.

A quantity of 720 grams of dry resin was then weighed and placed in a column having an internal diameter of 4 mm. and a height of 11 cms. The column was fitted at the bottom end with a syringe end-piece and a hypodermic needle which makes it possible to add the trap without any appreciable dead volume. The trap consists of a second column having the same internal diameter and containing 180 milligrams of resin to a depth of 3 cms.

There were prepared 50 ml. of a solution containing 1 mc. of caesium-137 and inactive caesium having an ion concentration of $2.10^{-4}$ g./l., which represents the equivalent of 50 mc. in caesium-137.

The throughput was regulated at 0.3 ml./min. The total activity was fixed on the resin which was placed within the first column, with the result that, under predetermined conditions of counting:

$A_f = 115,000,000$ pulses per minute

The first elutions were carried out without the trap in order to permit the possibility of assessing the level of contamination. The results obtained are given hereunder:

| Eluting agent | $A_o$ | $A_r$ | E, Percent | C |
|---|---|---|---|---|
| 2 ml. H$_2$O | 48,000,000 | 0 | 41 | 0 |
| 2 ml. calcium | $10^8$ | 40 | 87 | $4 \times 10^{-7}$ |
| Levulinate | $8.7 \times 10^7$ | 20 | 80 | $2 \times 10^{-7}$ |

Consequently, even without trap, the levels of contamination remain wholly negligible. It is preferable, however, to provide for the use of the trap in the barium generator which is designed for medical purposes in order to provide a guarantee against accidental caesium escape.

What we claim is:

1. A method of preparing an aqueous solution of barium 137 which comprises the successive steps of:
   (a) contacting a solution of caesium 137 with a solid ferrocyanide of a transition element fixed on a solid support, so as to fix the caesium 137 thereon, and
   (b) contacting said solid ferrocyanide having fixed thereon the caesium 137 with an eluting agent selected from the group consisting of water and an aqueous solution of an eluting salt, so as to obtain by elution an aqueous solution of barium 137.

2. A method according to claim 1 wherein said solid ferrocyanide of a transition element is fixed on a solid support selected from the group consisting of collodion and an ion exchange resin.

3. A method according to claim 2 wherein the solid support is an anion exchange resin having a granulometry of from 0.1 to 0.2 mm.

4. A method according to claim 1 wherein the solid ferrocyanide of a transition element is obtained by (1) treating a colloidal ferrocyanide medium, obtained by mixing a solution of a ferrocyanide of an alkali metal salt with a solution of a salt of a transition element, with a quaternary ammonium salt so as to flocculate the ferrocyanide of the transition element, (2) dissolving the flocculate in a volatile solvent therefor and (3) finally evaporating the solvent so as to obtain said solid ferrocyanide.

5. A method according to claim 4 wherein directly prior to step (3), an ethyl acetate solution of collodion is added to the solution of step (2) and then the solvents are evaporated to produce a solid ferrocyanide of a transition element fixed on a collodion support.

6. A method according to claim 3 wherein the ferrocyanide of the transition element is fixed on the resin by contacting the resin with a colloidal suspension of a mixture of an alkali metal ferrocyanide solution with a solution of a salt of a transition element.

7. A method according to claim 3 wherein the ferrocyanide of the transition element is fixed to said resin by first fixing ferrocyanide anions on said resin by contacting said resin with a solution of an alkali metal ferrocyanide and subsequently contacting said resin with an aqueous solution of a salt selected from the group consisting of copper sulfate, copper nitrate and copper chloride.

8. A method according to claim 7 wherein the aqueous salt solution is 5 m./l. solution of copper chloride.

9. A method according to claim 8 wherein the salt solution contains in addition to the copper chloride, potassium chloride in a concentration of 1 m./l.

10. A method according to claim 1 wherein the aqueous solution of barium 137 obtained from step (b) is passed in contact with an anion exchange resin which was previously contacted with a ferrocyanide solution of an alkali metal.

11. A method according to claim 1 wherein the eluting agent is an aqueous salt solution and wherein the salt solution has previously been passed through a sterilizing filter.

12. A method according to claim 1 wherein the eluting agent is an aqueous solution of a salt selected from the group consisting of a water soluble barium salt, a water soluble sodium salt, calcium nitrate, calcium gluconate and calcium levulinate.

No references cited.

CARL D. QUARFORTH, *Primary Examiner.*

BENJAMIN R. PADGETT, *Examiner.*

A. J. STEINER, *Assistant Examiner.*